United States Patent
Gibson (10) Patent No.: US 10,827,025 B2
(45) Date of Patent: Nov. 3, 2020

(54) ALLOCATIONS OF ARBITRARY WORKLOADS AMONG HYPERCONVERGED NODES

(71) Applicant: Hewlett Packard Enterprise Development LP, Houston, TX (US)

(72) Inventor: Robert Ross Gibson, Westbourough, MA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 261 days.

(21) Appl. No.: 15/786,697

(22) Filed: Oct. 18, 2017

(65) Prior Publication Data

US 2019/0116237 A1    Apr. 18, 2019

(51) Int. Cl.
| | |
|---|---|
| G06F 15/173 | (2006.01) |
| H04L 29/08 | (2006.01) |
| G06F 9/50 | (2006.01) |
| H04L 12/24 | (2006.01) |

(52) U.S. Cl.
CPC ........ *H04L 67/2833* (2013.01); *G06F 9/5027* (2013.01); *G06F 9/5038* (2013.01); *G06F 9/5072* (2013.01); *H04L 41/0816* (2013.01); *H04L 67/32* (2013.01); *G06F 9/505* (2013.01); *G06F 9/5077* (2013.01); *G06F 2209/504* (2013.01); *H04L 41/50* (2013.01)

(58) Field of Classification Search
CPC ..... H04L 41/14; H04L 41/0816; H04L 43/08; H04L 67/1008; G06F 2209/5022; G06F 9/45558; G06F 9/5038; G06F 9/5083
USPC ........................................ 709/223, 224, 226
See application file for complete search history.

(56) References Cited

U.S. PATENT DOCUMENTS

| | | | |
|---|---|---|---|
| 9,626,211 B2 | 4/2017 | Riewrangboonya et al. | |
| 2009/0070771 A1* | 3/2009 | Yuyitung | .............. G06Q 10/06 718/105 |
| 2013/0191527 A1 | 7/2013 | Ashok et al. | |
| 2013/0268940 A1 | 10/2013 | Gmach et al. | |
| 2014/0047084 A1* | 2/2014 | Breternitz | ........... H04L 67/1008 709/221 |

(Continued)

FOREIGN PATENT DOCUMENTS

WO    WO-2017074491 A1    5/2017

OTHER PUBLICATIONS

Cassandra Rowe, "How to Size Your Infrastructure to Optimize Your End User Experience," Apr. 5, 2017, pp. 1-9 [online], Retrieved from the Internet on Sep. 15, 2017 at URL: <https:community.hpe.com/t5/Converged-Data-Center/How-to-size-your-infrastructure-to-optimize-your-end-user/ba-p/6954237#.Wbt2Qa7vPIW.

(Continued)

*Primary Examiner* — Wing F Chan
*Assistant Examiner* — Andrew Woo
(74) *Attorney, Agent, or Firm* — Jaffery Watson Mendonsa & Hamilton (57) ABSTRACT

Example implementations related to hyperconverged loads. In an example, a set of system characteristics is defined for a hyperconverged system. A plurality of components of an arbitrary workload running on a computing system are then separately modeled. The modeling converts the plurality of components into a plurality of respective hyperconverged loads. The plurality of respective hyperconverged loads are then allocated among a set of hyperconverged nodes that satisfies the set of system characteristics.

17 Claims, 6 Drawing Sheets

(56) References Cited

U.S. PATENT DOCUMENTS

2017/0185444 A1 6/2017 Tenczar et al.

OTHER PUBLICATIONS

Cisco Systems, Inc., "Cisco Hyperflex Systems," Feb. 2017, pp. 1-16, Solution Overview.
Datalink, "Your Data Center of the Future Starts with the Cloud," 2015, pp. 1-7 [online], Retrieved from the Internet on Sep. 14, 2017 at URL: <https://www.datalink.com/Solutions/Cloud/Workload-and-Platform-Alignment.
Scale Computing, "Scale Computing Radically Changes Price-performance in the Datacenter with Fully Automated Flash Tiering," May 3, 2016 [online], pp. 1-2, Retrieved from the Internet http://marketwired.com/press-release/scale-computing-rad ically-changes-price-performance-datacenter-with-fully-automated-2120739.htm.
Turbonomic, Inc., "Turbonomic Workload Edition Data Sheet," Aug. 15, 2016, pp. 1-4 [online], Retrieved from the Internet on Sep. 14, 2017 at URL: <https://turbonomic.com/resources/turbonomic-workload-edition.
Vicky Burdett, "Scale Computing Announces Hyperconverged Appliances Designed for Storage Hungry Data Centres," Jul. 18, 2017, pp. 1-3 [online], Retrieved from the Internet on Sep. 15, 2017 at URL: http://www.cmsdistributrion.com/scale-computing-announces-hyperconverged-appliances-designed-storage-hungry-data-centres.
European Search Report and Search Opinion Received for EP Application No. 18200617.1, dated Mar. 22, 2019, 9 pages.

* cited by examiner

ALLOCATIONS OF ARBITRARY WORKLOADS AMONG HYPERCONVERGED NODES

BACKGROUND

Hyperconverged systems allow various information technology resources, such as compute, storage, networking, and virtualization resources, to be tightly integrated in a single, software-driven appliance, often supported by a single vendor. These resources are then managed as a single system, using a common toolset.

In general, a hyperconverged system includes a base unit or node, and can be easily scaled by adding one or more additional hyperconverged nodes to create pools of shared compute and storage resources. Thus, hyperconverged systems can provide the flexibility of a public cloud infrastructure, while allowing customers to maintain control of the hardware.

DETAILED DESCRIPTION

The present disclosure broadly describes an apparatus, method, and non-transitory computer-readable medium for allocating arbitrary workloads among hyperconverged nodes. As discussed above, hyperconverged systems allow various information technology resources, such as compute, storage, networking, and virtualization resources, to be tightly integrated in a single, software-driven appliance ("node"), which may be supported by a single vendor in some examples.

Sizing a hyperconverged system, i.e., determining just how many nodes to provision to handle a workload that is currently running on an existing, non-hyperconverged system, is a challenge. Workloads run in a fundamentally different way on hyperconverged nodes due to the optimization of data flow, storage, backup, and retention in the hyperconverged system. As a result, there are challenges associated with predicting how many hyperconverged nodes are needed to run an arbitrary, composite workload, and also with predicting how an arbitrary, composite workload will load a set of hyperconverged nodes. This is especially true when hyperconverged systems may be available in multiple different configurations, which makes it more difficult to track performance differences across all of the possible configurations. Moreover, a workload whose resource consumption is arbitrary or unpredictable (e.g., there is little to no a priori knowledge of the workload's resource consumption) can further complicate the sizing process.

Examples of the present disclosure model an existing workload (e.g., a workload running on an existing, non-hyperconverged system) using detailed workload statistics that describe properties of the workload (e.g., CPU usage, memory usage, hypervisor/system overhead, etc.) that is collected directly from the non-hyperconverged system. Some properties of the workload may not be known a priori. Different components of the workload (e.g., virtual machine, process, container, etc. in the case of virtualized workloads, or bare metal installations without hypervisors, etc. in the case of non-virtualized workloads) are modeled separately, and the model for each component is then converted to a "hyperconverged" load on a hyperconverged system, using a set of system characteristics describing the desired capacity and performance of the hyperconverged system (e.g., CPU performance, memory performance, etc.) to size the hyperconverged system. The modeled components of the workload represent the fractions of the hyperconverged system that are used to service the components. The modeled components are next allocated among a set of hyperconverged nodes that satisfy the set of system characteristics, where the allocating respects a set of constraints. This allocation may be performed for multiple different hardware configurations, logical configurations, and/or software configurations of the hyperconverged system. For instance, different hardware configurations may deploy different nodes of different sizes, connected in different ways. Different logical configurations may utilize different algorithms that perform differently. Different software configurations may use different releases or versions of a software program or application, where the different releases or versions perform differently. A recommendation may identify a particular hardware configuration that best meets some stated criteria (e.g., usage of hyperconverged system, cost, etc.) and a prediction as to how the workload will run on the particular hardware configuration. The recommendation may identify, for example, how many nodes of a given hardware configuration are used to adequately support the workload.

Examples of the present disclosure are described with reference to an "arbitrary workload." Within the context of the present disclosure, an arbitrary workload is understood to be a workload whose resource consumption patterns are not fully known a priori. An arbitrary workload stands in contrast, therefore, to other types of workloads whose resource consumption patterns tend to be relatively predictable and uniform (e.g., such as virtual desktop infrastructure or VDI workloads). However, such examples are not intended to limit the use of the disclosed methods and systems to sizing hyperconverged systems for running arbitrary workloads. For instance, the same methods and systems could also be used to size hyperconverged systems designed for running non-arbitrary (e.g., predictable, uniform, and known) workloads.

Moreover, although examples of the present disclosure are described within the context of moving a workload from a non-hyperconverged system to a hyperconverged system, the same methods and systems could also be used to move a workload from one hyperconverged system to another hyperconverged system. For instance, this may be the case when an existing hyperconverged system is being replaced or upgraded. Such methods and systems could also be useful in verifying the sizing of a hyperconverged system after it begins running a workload (e.g., verifying that the sizing is appropriate).

Figure 1:
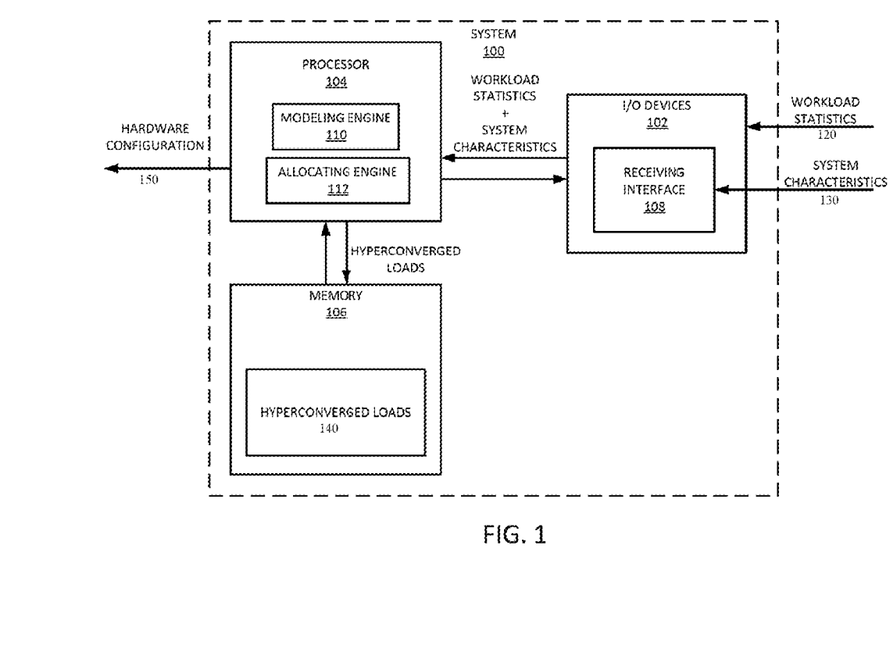
FIG. 1 illustrates a block diagram of an example sizing system of the present disclosure.

FIG. 1 illustrates a block diagram of an example sizing system 100 of the present disclosure. The sizing system 100 may receive inputs directly from a first computing system (e.g., a non-hyperconverged system) that is currently running a workload as well as from a user. The sizing system 100 may determine, based at least in part on these inputs, a recommended hardware configuration 150 for a target computing system (e.g., a hyperconverged system) that is capable of running the workload subject to any user-defined constraints. In one example, the sizing system 100 may be implemented on a computing system as illustrated, for instance, in FIG. 5. In another example, the sizing system 100 may be implemented as a standalone kiosk. In one example, the sizing system 100 generally comprises a set of input/output (I/O) devices 102, a processor 104, and a memory 106.

The set of I/O devices 102 may include, for example, storage devices (including, but not limited to, a tape drive, a floppy drive, a hard disk drive or a compact disk drive), a receiver, a transmitter, a speaker, a display, an output port (e.g., a universal serial bus (USB) port), an input port (e.g., a USB port), a network interface, and a user input device, such as a keyboard, a keypad, a mouse, and the like. In one example, the set of I/O devices 102 further includes a receiving interface 108. In one example, the receiving interface 108 may comprise a graphical user interface (GUI) that presents a display or interface through which a user can provide a desired set of system characteristics 130 for a hyperconverged system. In another example, the receiving interface 108 may comprise an interface via which a specification file or other data file can be uploaded from a remote computing device (e.g., a computing device on which the specification file or other data file was created). The receiving interface 108 may be accessible by a user through a web portal. The hyperconverged system may be a system to which the user wishes to move an arbitrary workload. Thus, the set of I/O devices 102 may also include one or more I/O devices (e.g., ports, network interfaces, etc.) through which workload statistics 120 (e.g., statistics via which characteristics of the arbitrary workload can be inferred) can be obtained from a system (e.g., a non-hyperconverged system) on which the arbitrary workload is currently running.

The processor 104 may be in communication with the set of I/O devices 102 and may include at least a modeling engine 110 and an allocating engine 112. The "engines" described herein may be any combination of hardware and programming to implement the functionalities described herein. In some implementations, the programming may be processor-executable instructions stored on a non-transitory machine-readable storage medium, and the hardware may include at least one processing resource to retrieve and/or execute those instructions. Example processing resources include a microcontroller, a microprocessor, a central processing unit (CPU) core, an application-specific integrated circuit (ASIC), a field programmable gate array (FPGA), or the like. Example non-transitory machine-readable media include random access memory (RAM), read-only memory (ROM), electrically erasable programmable read-only memory (EEPROM), flash memory, a hard disk drive, or the like. The term "non-transitory" does not encompass transitory propagating signals; nor is it intended to imply that the machine-readable media cannot be altered or changed (e.g., due to a natural degradation of the machine-readable media over time). Additionally or alternatively, the engines may include electronic circuitry or logic for implementing functionality described herein.

The modeling engine 110 of the processor 104 may be configured to model components of the arbitrary workload as individual "hyperconverged loads." The allocating engine 112 of the processor 104 may be configured to subsequently allocate these hyperconverged loads 140 among a set of hyperconverged nodes configured to satisfy the desired set of system characteristics 130. In one example, the processor 104 may store the hyperconverged loads 140 in the memory 106. The hyperconverged loads 140 can thus be retrieved from the memory 106 when the processor 104 is evaluating different configurations of hyperconverged nodes and allocated by the processor 104 among the nodes of the different configurations.

Figure 2:
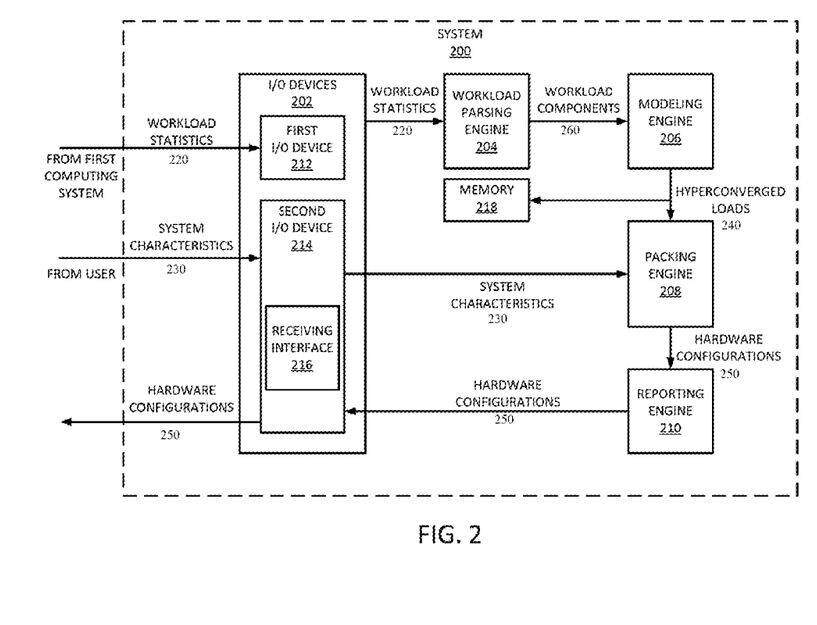
FIG. 2 illustrates a block diagram of another example sizing system of the present disclosure.

FIG. 2 illustrates a block diagram of another example sizing system 200 of the present disclosure. Like the sizing system 100, the sizing system 200 may receive inputs directly from a first computing system (e.g., a non-hyperconverged system) that is currently running a workload as well as from a user. The sizing system 200 may determine, based at least in part on these inputs, a recommended hardware configuration 250 for a target computing system (e.g., a hyperconverged system to which a workload running on the first computing system is to be moved) that is capable of running the workload subject to any user-defined constraints. In one example, the sizing system 200 may be implemented on a computing system as illustrated, for instance, in FIG. 5. In another example, the sizing system 200 may be implemented as a standalone kiosk.

In one example, the sizing system 200 generally comprises a set of input/output (I/O) devices 202, a workload parsing engine 204, a modeling engine 206, a packing engine 208, and a reporting engine 210.

The set of I/O devices 202 may include, for example, storage devices, including but not limited to, a tape drive, a floppy drive, a hard disk drive or a compact disk drive, a receiver, a transmitter, a speaker, a display, an output port (e.g., a universal serial bus (USB) port), an input port (e.g., a USB port), a network interface, and a user input device, such as a keyboard, a keypad, a mouse, and the like.

In one example, a first I/O device 212 of the set of I/O devices 202 may be configured to be communicatively coupled to a first computing system (e.g., a non-hyperconverged system) on which a workload is currently running. This first I/O device 212 may thus be capable of collecting detailed workload statistics 220 from the first computing system. These workload statistics 220 may include, for example, a complete record of central processing unit (CPU) usage, memory usage, network usage, hypervisor/system overhead, and storage I/O reads and writes (e.g., size, type, target, and time) for every unit of time (e.g., x minutes) over a window of time (e.g., y hours) of system usage. Viewing the workload over small units of time (e.g., second by second, rather than as a bottom line, greatest, or average workload) allows the system 200 to see, for instance, whether, when, and/or under what circumstances spikes in the workload may occur, as well as how large the spikes may be. This, in turn, will help to ensure that the target computing system is configured to tolerate these spikes without over-provisioning resources.

A second I/O device 214 of the set of I/O devices 202 may be configured to be directly manipulated by a user, e.g., through the use of a receiving interface 216 (e.g., a GUI or an interface through which a specification file or other data file can be uploaded from a remote terminal). The receiving interface 216 may be accessible by a user through a web portal. This second I/O device 214 may thus be capable of collecting input from the user regarding desired characteristics of and/or constraints on a target computing system (e.g., a hyperconverged system to which a workload running on the first computing system is to be moved). The target computing system may be a system to which the user wishes to move the workload. Thus, the desired characteristics of the target computing system may include, for instance, characteristics that describe limits on the CPU, memory, networking, and/or storage utilization of the hyperconverged system. In one example, at least one set of desired characteristics is defined by the user for each possible individual hardware configuration 250 of the hyperconverged system. In another example, the sizing system 200 may be aware of different possible hardware configurations 250 for the hyperconverged system, and may automatically (e.g., without direction from the user) rule out, prior to obtaining the desired characteristics, which of the possible hardware configurations 250 are likely to be unworkable for the workload. In further examples, the sizing system 200 may not use a GUI or I/O device to collect the desired characteristics.

The first I/O device 212 may be coupled to the workload parsing engine 204. The workload parsing engine 204 may be configured to divide the workload, based on the workload statistics 220 provided via the first I/O device 212, into a plurality of discrete components. The particular manner in which the workload is divided may depend on the format of the workload statistics 220. For instance, if the workload statistics 220 are being read from a customer site, the manner in which the workload is divided may depend on the type(s) of system the customer is running (e.g., bare-metal LINUX, WINDOWS, VMWARE, HYPERV, or another type of operating system or platform). Deduplication and compression could be estimated from stored workload statistics 220, if accessible. The manner in which the workload is divided could also be dependent on security concerns (e.g., what data the customer allows access to).

The plurality of discrete components into which the workload is divided may include, for example, a virtual machine component, a process component, a container component, a server component, a bare metal component, and/or other components (e.g., depending on whether the workload is virtualized or non-virtualized). In one example, the workload parsing engine 204 may organize each of these components into arrays of workloads per virtual machine minute (or per other unit of time).

The workload parsing engine 204 may be coupled to the modeling engine 206. The modeling engine 206 may be configured to separately convert each of the workload components 260 provided by the workload parsing engine 204 into a theoretical "hyperconverged load," e.g., a fraction of a hyperconverged node that is consumed or used by the corresponding workload component (potentially accounting for fault tolerance, backups, and/or the like). For instance, in one example, when measuring I/Os of a virtual machine per unit of time, the I/Os measured during that time may be classified into different categories, which may be based on the sizes of the I/Os, the current distribution of the I/O types, the deduplication rate of the I/Os, and/or other factors. Each class will have a certain workload cost associated with it, so that the total cost of the workload in a single unit of time would be, in this example, the number of I/Os in a class multiplied by the cost of that class, taken over all of the classes.

In one example, the modeling engine 206 may calculate the fraction of the hyperconverged node used by each resource (e.g., CPU, memory, storage, etc.) for each virtual machine for every unit of time (e.g., x minutes) over a window of time (e.g., y hours) of monitoring on the first computing system. However, a hyperconverged load 240 may be more than raw storage usage (e.g., number of gigabytes consumed), and may also include a dynamic component (e.g., I/Os of a specific size per unit of time, latency, etc.).

In one example, the modeling engine 206 uses the user inputs collected by the second I/O device 214 to perform this conversion. For instance, desired characteristics of the hyperconverged system (e.g., overhead for backups, deduplication, compression, data redundancy, fault tolerance, and the like) may become part of the calculated "load" used for sizing the hyperconverged system. In one example, where the desired system characteristics 230 (e.g., maximum or target workloads) are defined for a plurality of different hyperconverged hardware configurations 250, each of the workload components 260 may be converted to a plurality of different hyperconverged loads 240 (e.g., one hyperconverged load for each of the different hyperconverged hardware configurations). For instance, a given virtual machine workload running on the first computing system may be modeled to estimate its corresponding hyperconverged load 240 on each of the possible hardware configurations 250 for the target computing system (e.g., each of the possible hyperconverged system hardware configurations offered by a vendor). Thus, each component of a workload becomes a generic hyperconverged load on a particular hardware configuration. The "hyperconverged load" is a general statistic that applies to hyperconverged nodes, so that components of the workload running on the first computing system can be sized even if the components originate in different computing environments. As discussed in greater detail below, this allows generic mixed workloads (e.g., processes, containers, and/or virtual machines from multiple different hypervisors or bare metal installations without hypervisors) to be accounted for together in the sizing calculation. In one example, the modeling engine 206 stores the hyperconverged loads 240 in a memory 218, e.g., so that the hyperconverged loads may be accessed later in conjunction with the evaluation of new hardware configurations 250, auditing processes, or other processes.

In one example, the modeling engine 206 is coupled to the packing engine 208. The packing engine 208 arranges the set of hyperconverged loads 240 (e.g., for CPU, memory, storage, and the like) generated by the modeling engine 206 onto a hyperconverged hardware configuration (e.g., a particular configuration of hyperconverged nodes). In one example, the packing engine observes one or more constraints in order to prevent any of the hyperconverged nodes of the hyperconverged hardware configuration from becoming overloaded in any particular type or component of the workload. Possible constraints to observe in connection with this arrangement are discussed in further detail with respect to FIG. 4. In one example, the packing engine 208 may further perform error checking, auditing, and other functions in the course of arranging the hyperconverged loads on the hyperconverged hardware configurations 250.

The packing engine 208 is coupled to the reporting engine 210. In one example, the reporting engine 210 may itemize the calculations generated by the modeling engine 206 and select one or more hyperconverged hardware configurations 250, as arranged by the packing engine 208, as a recommended configuration. The reporting engine 210 may also identify how many nodes of a given hardware configuration are used to adequately support the workload and/or predict how the workload will run on the given hardware configuration.

Figure 3:
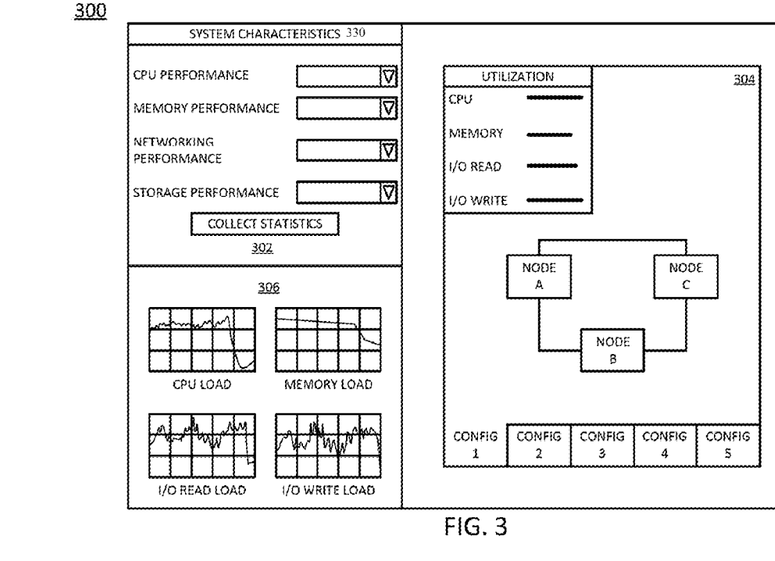
FIG. 3 illustrates an example screenshot of a graphical user interface such as may be displayed in connection with the system of FIG. 1 or the system of FIG. 2.

FIG. 3 illustrates an example screenshot 300 of a graphical user interface (GUI) such as may be displayed in connection with the sizing system 100 of FIG. 1 or the sizing system 200 of FIG. 2. For instance, the screenshot 300 may be part of a GUI of the receiving interface 108 or the receiving interface 216. However, the arrangement and appearance of the GUI may vary and is not limited to the examples shown in FIG. 3. For instance, the GUI may include different tabs that allow simplified or detailed information to display at different times, additional input buttons, and the like. Furthermore, the actual information presented by the GUI may vary from what is illustrated (e.g., more, less, or different information may be presented).

In one example, the GUI may include a first frame 302 comprising a plurality of input fields via which a user may provide a set of desired system characteristics 330 (e.g., maximum or target workloads) for a hyperconverged system that is to run a workload. For instance, the first frame 302 may include fields for the user to provide desired limits on CPU, memory, networking, and storage utilization characteristics. The fields may allow for freeform entry of data, or may provide a menu (e.g., a drop down menu) via which the user can select an option from among a set of predefined options. The first frame may also include a button or other construct via which the user can initiate the collection of workload statistics from the system (e.g., a non-hyperconverged system) on which the workload is currently running.

The GUI may also include a second frame 304 that presents one or more proposed hardware configurations (e.g., sets of nodes) for a hyperconverged system that satisfies the set of desired system characteristics 330 and is capable of running the workload. The third frame 304 may, for instance, include a plurality of tabs, where the selection of one of the tabs displays a representation of a particular hardware configuration for the hyperconverged system. The representation may be manipulable by a user, e.g., by clicking and dragging to add, drop, or relocate nodes. Such manipulation of the representation might result in updates to other frames or portions of the GUI. The third frame 304 may further indicate a particular software and/or logical configuration associated with each depicted hardware configuration, as well as a number of nodes of a given hardware configuration that is used to adequately support the workload and/or a set of constraints (e.g., loading limits) on the nodes.

The GUI may also include a third frame 306 that displays utilization information (e.g., fractions of the hyperconverged nodes that are utilized) for a currently displayed hardware configuration. For instance, the third frame 306 may display what a given hyperconverged load would look like on a hyperconverged node of the hardware configuration currently depicted in the second frame 304. The third frame 306 may display what the hyperconverged load would look like for: (1) each individual workload component (e.g., each virtual machine); and/or (2) the combined hyperconverged workload of each type (e.g., CPU, memory, storage) for each hyperconverged node of the hardware configuration.

In further examples, any one or more of the frames 302-306 may be displayed individually as a full screen, or may include an option to be displayed in a full-screen layout. Moreover, the GUI may include additional frames for displaying additional information, collecting additional user inputs, or the like.

Figure 4:
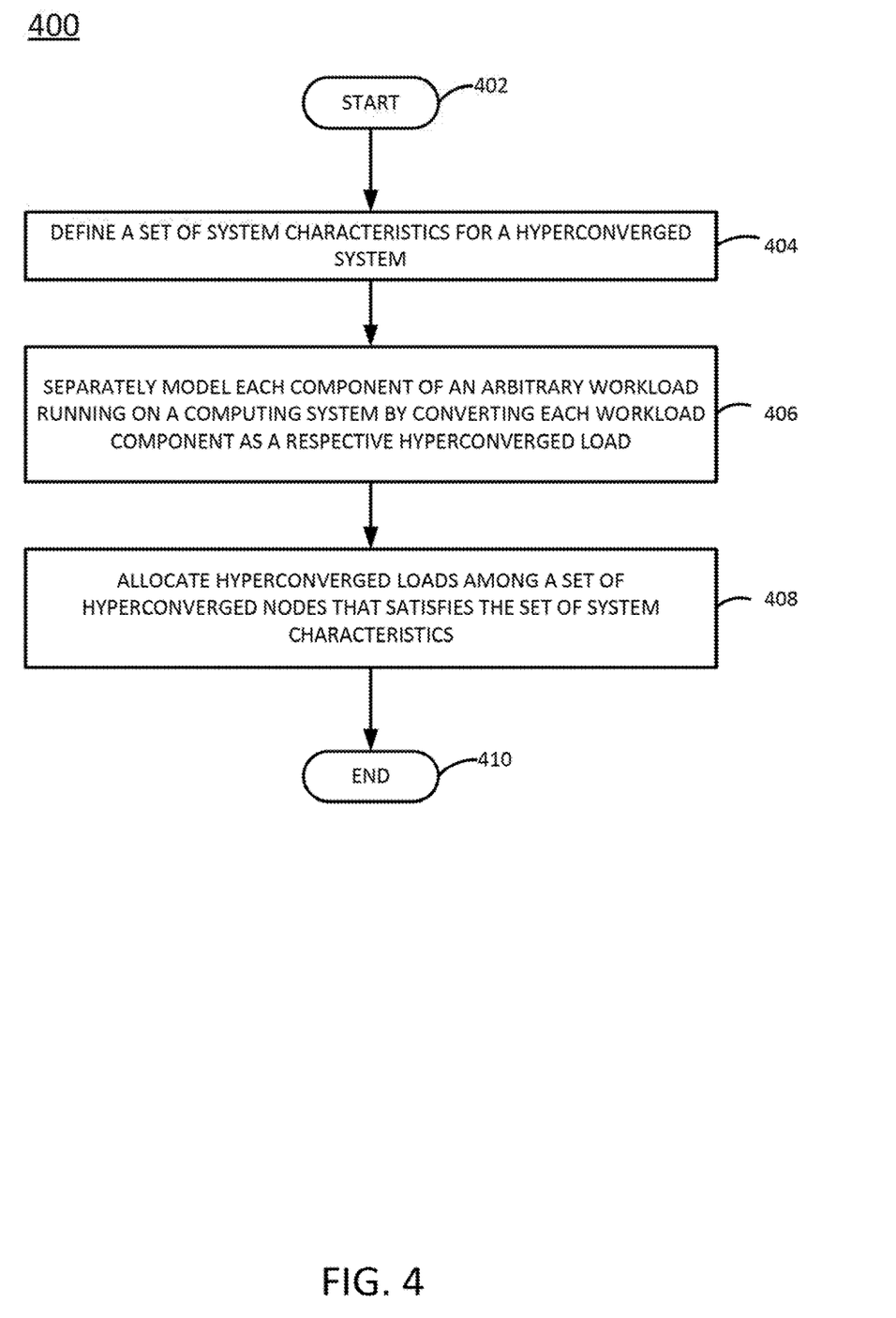
FIG. 4 illustrates a flowchart of an example method for allocating arbitrary workloads among hyperconverged nodes.

FIG. 4 illustrates a flowchart of an example method 400 for allocating arbitrary workloads among hyperconverged nodes. The method 400 may be performed, for example, by the sizing system 100 illustrated in FIG. 1 or the sizing system 200 illustrated in FIG. 2. As such, reference may be made in the discussion of FIG. 4 to various components of the systems 100 and/or 200 to facilitate understanding. However, the method 400 is not limited to implementation with the systems illustrated in FIGS. 1 and 2.

The method 400 begins in block 402. In block 404, a set of system characteristics (e.g., desired characteristics and/or constraints) is defined for a target computing system, which in one example is a hyperconverged system. For instance, the target computing system may be a hyperconverged system to which a user wishes to move a workload currently running on another (e.g., non-hyperconverged) computing system. The set of system characteristics may be provided by the user. In one example, at least one set of system characteristics is defined for each possible individual hardware configuration of the target computing system.

In block 406, each component of an arbitrary workload currently running on a computing system (e.g., a non-hyperconverged system) is separately converted or modeled into a respective, theoretical "hyperconverged load" (e.g., a fraction of a hyperconverged node that is consumed or used by the corresponding workload component, potentially accounting for fault tolerance, backups, and/or the like).

In block 408, the hyperconverged loads (e.g., for CPU, memory, storage, and other workload components) modeled in block 406 are allocated among a set of hyperconverged nodes representing a hyperconverged hardware configuration that satisfies the set of system characteristics defined in block 404. In one example, allocation of the hyperconverged loads observes one or more constraints in order to prevent any of the hyperconverged nodes of the hyperconverged hardware configuration from becoming overloaded in any particular type or component of the workload (e.g., from becoming loaded beyond a threshold loading for longer than a predefined period of time). The arrangement of the hyperconverged loads may also target a particular (e.g., generic, specified, or optimal) distribution of loads across the set of hyperconverged nodes.

Block 408 may be repeated a plurality of times, e.g., once for each hardware configuration of the hyperconverged system that is under consideration, so that the performances of different hardware configurations for the same workload can be compared.

The method 400 ends in block 410.

Figure 5:
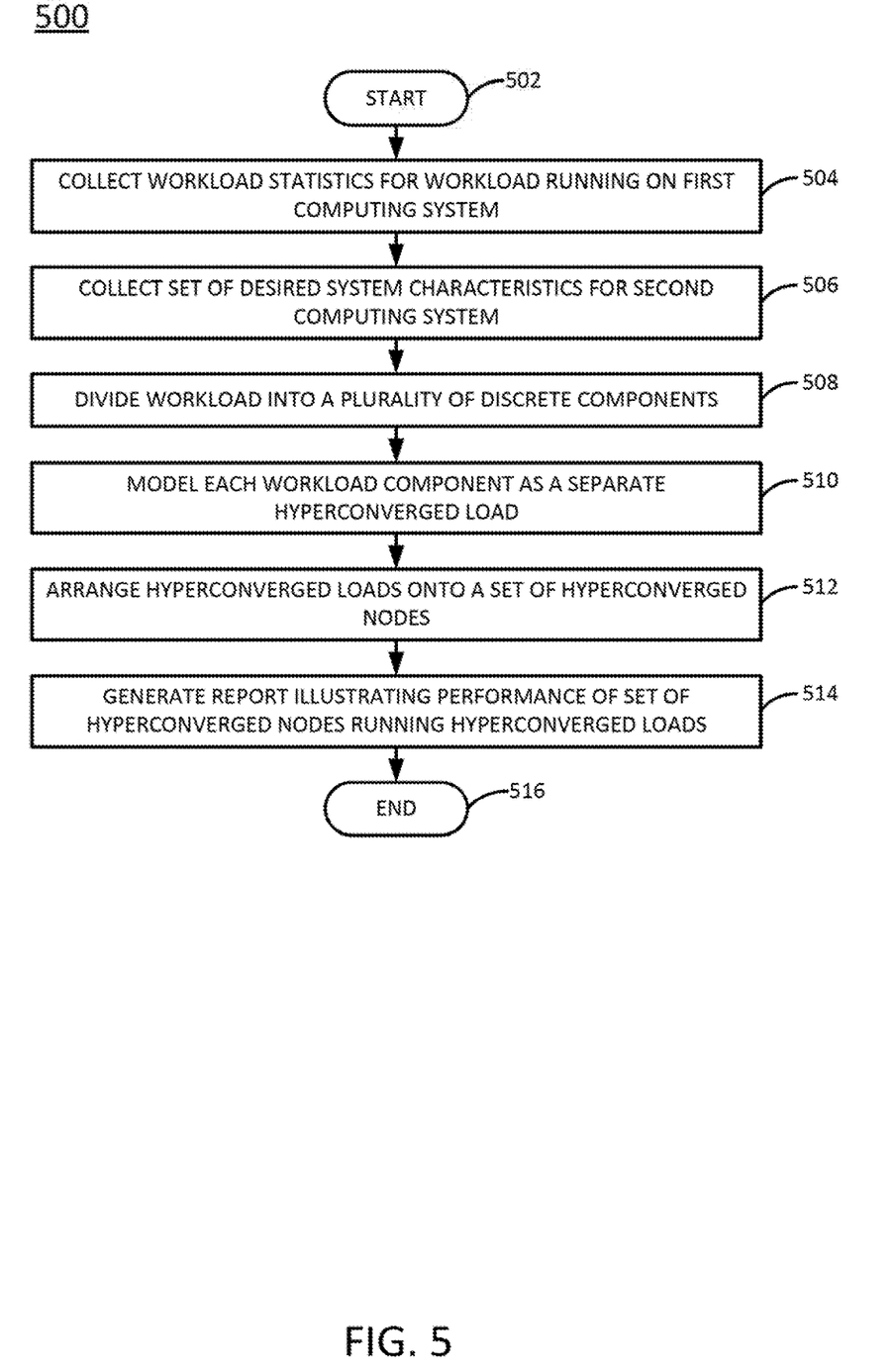
FIG. 5 illustrates a flowchart of another example method for allocating arbitrary workloads among hyperconverged nodes.

FIG. 5 illustrates a flowchart of another example method 500 for allocating arbitrary workloads among hyperconverged nodes. The method 500 may be performed, for example, by the sizing system 100 illustrated in FIG. 1 or the sizing system 200 illustrated in FIG. 2. As such, reference may be made in the discussion of FIG. 5 to various components of the systems 100 and/or 200 to facilitate understanding. However, the method 500 is not limited to implementation with the systems illustrated in FIGS. 1 and 2.

The method 500 begins in block 502. In block 504, workload statistics for a workload running on a first computing system (e.g., a non-hyperconverged system) are collected. These workload statistics may include, for example, a complete record of central processing unit (CPU) usage, memory usage, network usage, hypervisor/system overhead, and storage I/O reads and writes (e.g., size, type, target, and time) for every unit of time (e.g., x minutes) over a window of time (e.g., y hours) of system usage. As an example, if the first computing system includes a VMware cloud computing environment, the collected workload statistics might include low-level ESXTOP and/or vscsiStats information.

In a further example, the workload statistics collected in block 504 may be obtained for each individual workload component (e.g., virtual machine, container, bare metal, etc.) separately. For instance, the first computing system may include several different compute nodes/servers. Moreover, the workloads running on the first computing system may include workloads of diverse types (e.g., virtual machines, containers, bare metal, etc.). Thus, the above description does not necessarily imply that a single workload stream is collected in block 504. Thus, diverse workloads may be collected in block 504 and may be further divided at a later stage of the method 500 (e.g., as described below in connection with block 508).

In block 506, input is collected (e.g., from a user) regarding desired characteristics of and/or constraints on a target computing system (e.g., a hyperconverged system). The target computing system may be a system to which the user wishes to move the workload. Thus, in one example, the characteristics of the target computing system may be collected or defined in block 506 in a manner similar to block 404 of FIG. 4. The desired characteristics of the target computing system may include, for instance, characteristics that describe limits on the CPU, memory, networking, and/or storage utilization of the hyperconverged system. The set of desired characteristics may more specifically include overhead for backups, de-duplication, compression, data redundancy, fault tolerance, and the like. In one example, at least one set of desired characteristics is defined for each possible individual hardware configuration of the target computing system.

In block 508, the workload is divided, based on the workload statistics collected in block 504, into a plurality of discrete components. The plurality of discrete components may include, for example, a virtual machine component, a process component, a container component, a server component, a bare metal component, and/or other components. In one example, each of these components may be organized into arrays of workloads per virtual machine minute (or per other unit of time).

In some cases, the workload components may already be (inherently) split upon collection in block 504, as discussed above (e.g., due to the different workload components running on different nodes or servers of the first computing system). For instance, the various software products that may be running on the first computing system may have their own unique reporting formats, which may vary in terms of the level of detail they provide. Some formats may deliver combined workload data in a single data stream, but may contain enough metadata to allow the workload to be split up into per-virtual machine or per-process components on the receiving end. Other formats may split the workload into components that are delivered in separate data streams. Still other formats may not be able to be fully parsed due to proprietary arrangements of data, in which case, assumptions about the workload components may be made (e.g., based on available metadata). In each case, the method by which the workload is split into components may be tailored to match the format in which the workload statistics are received.

In block 510, each of the workload components is separately converted or modeled into a theoretical "hyperconverged load," e.g., a fraction of a hyperconverged node that is consumed or used by the corresponding workload component (potentially accounting for fault tolerance, backups, and/or the like). For instance, the fraction of the hyperconverged node used by each resource (e.g., CPU, memory, storage, etc.) may be calculated for each virtual machine for every unit of time (e.g., x minutes) over a window of time (e.g., y hours) of monitoring on the first computing system.

In one example, the user inputs collected in block 506 are used to perform this conversion. For instance, desired characteristics of the hyperconverged system (e.g., overhead for backups, de-duplication, compression, data redundancy, fault tolerance, and the like) may become part of the calculated "load" used for sizing the hyperconverged system. In one example, where the desired system characteristics (e.g., maximum or target workloads) are defined for a plurality of different hyperconverged hardware configurations, each of the workload components may be converted to a plurality of different hyperconverged loads (e.g., one hyperconverged load for each of the different hyperconverged hardware configurations). For instance, a given virtual machine workload running on the first computing system may be modeled to estimate its corresponding hyperconverged load on each of the possible hardware configurations for the target computing system (e.g., each of the possible hyperconverged system hardware configurations offered by a vendor). Thus, each component of a workload becomes a generic hyperconverged load on a particular hardware configuration. That is, the "hyperconverged load" is a general statistic that applies to hyperconverged nodes, so that the individual components of the workload can be sized even if they originate in different computing environments. Thus, generic mixed workloads (e.g., processes, containers, virtual machines from multiple different hypervisors, etc.) can be handled together when allocated among a set of hyperconverged nodes, as discussed below.

Collectively, in one example, blocks 504, 508, and 510 achieve functions similar to the modeling performed in block 406 of the method 400.

In block 512, the set of hyperconverged loads (e.g., for CPU, memory, storage, and the like) modeled in block 510 is arranged or allocated onto a hyperconverged hardware configuration (e.g., a particular configuration of hyperconverged nodes). This allows the user to see, in detail, how the hardware configuration responds to the workload (e.g., ratios of reads to writes, numbers of threads, etc. on a second-by-second basis). In one example, arrangement of the hyperconverged loads observes one or more constraints in order to prevent any of the hyperconverged nodes of the hyperconverged hardware configuration from becoming overloaded in any particular type or component of the workload (e.g., from becoming loaded beyond a threshold loading for longer than a predefined period of time). The arrangement of the hyperconverged loads may also target a particular (e.g., generic, specified, or optimal) distribution of loads across the set of hyperconverged nodes.

In one example, user-configurable tolerances may be associated with the loading of the hyperconverged nodes, e.g., such that a certain amount of excess loading (e.g., in excess of ninety percent, or even one hundred percent capacity in some cases) is permitted for a defined window of time (e.g., for up to x minutes, or during overnight system maintenance runs, etc.). For instance, as discussed above, viewing the workload over small units of time (e.g., second by second, rather than as a bottom line, greatest, or average workload) allows spikes in the workload to be identified. If a spike causes temporary excess loading on a node, it may be preferable to allow the node to be overloaded for that temporary period of time, rather than to replace the node with a larger node whose excess resources may go unused most of the time. In one example, the hyperconverged workloads that are arranged on the set of hyperconverged nodes in block 512 may be arranged in a manner that is independent of how the hyperconverged workloads ran in the first computing system from which the workload is being moved. However, in some cases (e.g., at the request of the user), arrangement of the hyperconverged workloads may attempt to preserve the original arrangement in the first computing system.

In one example the one or more constraints include at least one of the following: (1) None of the nodes may be loaded beyond a respective rated load, the excess loading is within a user-configurable tolerance defined for the node (as discussed above); (2) A configurable amount of room for expansion of the hyperconverged system is preserved; (3) The hyperconverged loads are scaled by a specified function to represent expected growth in the corresponding workloads over time; (4) It is verified that each component of the workload can fit on the hyperconverged node to which it is allocated; (5) It is verified that any combination of workload components that is allocated to a hyperconverged node will fit on the hyperconverged node in all load respects; (6) The impact of compression, de-duplication, and backup operations in the hyperconverged system as configured is modeled; (7) Any specified constraints for load distribution are met (e.g., a user may request some number of hyperconverged nodes to be loaded a certain amount less than other hyperconverged nodes in order to allow for future expansion); (8) The preservation of an audit trail is allowed, so that calculations can be reviewed in the future; (9) The optimization of workload arrangement is allowed, so that the user may be given a report that includes a recommendation that is optimal with respect to some user-defined criterion; (10) Sizing is calculated for each requested/possible individual hardware configuration of the hyperconverged system. In one example, arrangement of the hyperconverged loads onto the hyperconverged nodes also includes error checking, auditing, and other functions.

Block 512 may be repeated a plurality of times, e.g., once for each hardware configuration of the hyperconverged system that is under consideration, so that the performances of different hardware configurations for the same workload can be compared. Thus, in one example, the allocation of the hyperconverged loads in block 512 may be performed in a manner similar to block 408 of FIG. 4.

In block 514, a report may be generated that illustrates the performance of at least one specific hardware configuration of the hyperconverged system. In one example, the report may itemize load calculations and recommend particular virtual machine arrangements to optimize the workloads. The report may also identify a specific hardware arrangement that is optimal with respect to a user-specified criterion (including, e.g., how many nodes of a given hardware configuration are used to adequately support the workload and/or sets of constraints, like loading limits, on the nodes) and/or predict how the workloads will run on the specific hardware arrangement.

The method 500 ends in block 516.

It should be noted that although not explicitly specified, some of the blocks, functions, or operations of the methods 400 and 500 described above may include storing, displaying and/or outputting for a particular application. In other words, any data, records, fields, and/or intermediate results discussed in the method can be stored, displayed, and/or outputted to another device depending on the particular application. Furthermore, blocks, functions, or operations in FIGS. 4 and 5 that recite a determining operation, or involve a decision, do not necessarily imply that both branches of the determining operation are practiced. Moreover, blocks, functions, or operations of the above described method(s) can be combined, separated, and/or performed in a different order from that described above, without departing from the examples of the present disclosure.

Figure 6:
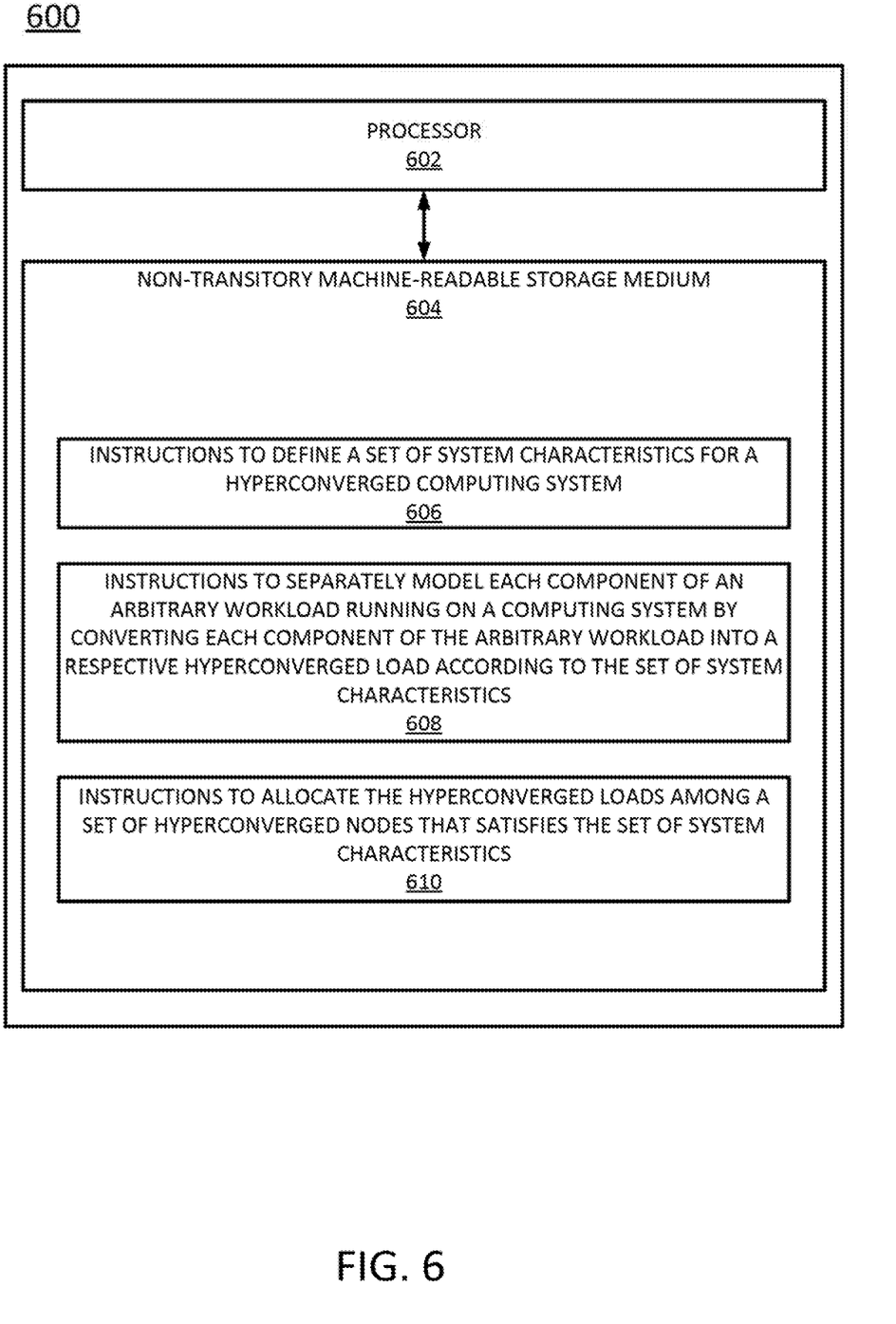
FIG. 6 depicts a high-level block diagram of an example computer that can be transformed into a machine capable of performing the functions described herein.

FIG. 6 depicts a high-level block diagram of an example computer 600 that can be transformed into a machine capable of performing the functions described herein. In one example, the computer 600 may be a system such as the sizing system 100 illustrated in FIG. 1 or the sizing system 200 illustrated in FIG. 2. In one example, the computer 600 may include a processor 602 and a non-transitory machine-readable storage medium 604. The non-transitory machine-readable storage medium 604 may include instructions 606, 608, and 610 that, when executed by the processor 602, cause the processor 602 to perform various functions.

The instructions 606 may include instructions to define a set of system characteristics for a target computing system (e.g., a hyperconverged system to which a workload running on a first computing system is to be moved). The set of system characteristics may include, for instance, characteristics that describe limits on the CPU, memory, networking, and/or storage utilization of the hyperconverged system. The set of system characteristics may more specifically include overhead for backups, de-duplication, compression, data redundancy, fault tolerance, and the like. In one example, at least one set of system characteristics is defined for each possible individual hardware configuration of the target computing system. The set of system characteristics may be received via a GUI or other receiving interface. The GUI, if present, may include different fields for the user to enter the set of system characteristics.

The instructions 608 may include instructions to separately model each component of a workload running on the first computing system by converting each workload component into a respective, theoretical "hyperconverged load" (e.g., a fraction of a hyperconverged node that is consumed or used by the corresponding workload component, potentially accounting for fault tolerance, backups, and/or the like) according to the set of system characteristics. For instance, the fraction of the hyperconverged node used by each resource (e.g., CPU, memory, storage, etc.) may be calculated for each virtual machine for every unit of time (e.g., x minutes) over a window of time (e.g., y hours) of monitoring on the first computing system. However, a hyperconverged load may be more than raw storage usage (e.g., number of gigabytes consumed), and may also include a dynamic component (e.g., I/Os of a specific size per unit of time, latency, etc.).

The instructions 610 may include instructions to allocate the set of hyperconverged loads (e.g., for CPU, memory, storage, and the like) among a set of hyperconverged nodes representing some hyperconverged hardware configuration (that satisfies the set of system characteristics. In one example, arrangement of the hyperconverged loads observes one or more constraints in order to prevent any of the hyperconverged nodes of the hyperconverged hardware configuration from becoming overloaded in any particular type or component of the workload.

In some examples, the non-transitory machine-readable storage medium 604 may include additional instructions, including, but not limited to: instructions to collect workload statistics for the arbitrary workload running on the first computing system, instructions to divide the arbitrary workload into a plurality of discrete components, and/or instructions to generate a report that illustrates the performance of at least one specific hardware configuration of the hyperconverged system.

It will be appreciated that variants of the above-disclosed and other features and functions, or alternatives thereof, may be combined into many other different systems or applications. Various presently unforeseen or unanticipated alternatives, modifications, or variations therein may be subsequently made which are also intended to be encompassed by the following claims.

What is claimed is:

1. A method, comprising:
defining a set of system characteristics for a hyperconverged system;
separately modeling a plurality of components of an arbitrary workload running on a computing system, wherein the modeling converts the plurality of components into a plurality of respective hyperconverged loads;
allocating the plurality of respective hyperconverged loads among a set of hyperconverged nodes that satisfies the set of system characteristics, wherein the allocation prevents any node of the set of hyperconverged nodes from becoming loaded beyond a threshold loading for longer than a predefined period of time;
repeating the allocating for a plurality of different sets of hyperconverged nodes, wherein each set of the plurality of different sets represents a different hardware configuration for the hyperconverged system; and
generating a recommendation that identifies a set of the plurality of different sets that is optimal with respect to a user-defined criterion and that identifies a prediction as to how the arbitrary workload will run on the set of the plurality of different sets, wherein the set of the plurality of different sets further identifies a number of hyperconverged nodes in the set of hyperconverged nodes.

2. The method of claim 1, wherein each of the hyperconverged load of the plurality of respective hyperconverged loads represents, for a corresponding component of the plurality of components, a fraction of a hyperconverged node of the set of hyperconverged nodes that is consumed by the corresponding component.

3. The method of claim 2, wherein the corresponding component describes a central processing unit usage of the arbitrary workload for every unit of time over a window of time of system usage.

4. The method of claim 2, wherein the corresponding component describes a memory usage of the arbitrary workload for every unit of time over a window of time of system usage.

5. The method of claim 2, wherein the corresponding component describes a network usage of the arbitrary workload for every unit of time over a window of time of system usage.

6. The method of claim 2, wherein the corresponding component describes a hypervisor overhead of the arbitrary workload for every unit of time over a window of time of system usage.

7. The method of claim 2, wherein the corresponding component describes storage reads and writes of the arbitrary workload for every unit of time over a window of time of system usage.

8. The method of claim 1, wherein the allocating is performed in a manner that targets a particular distribution of loads across the set of hyperconverged nodes.

9. A non-transitory machine-readable storage medium encoded with instructions executable by a processor, the machine-readable storage medium comprising:
instructions to define a set of system characteristics for a hyperconverged system;
instructions to separately model a plurality of components of an arbitrary workload running on a computing system, wherein modeling the plurality of components converts the plurality of components into a plurality of respective hyperconverged loads according to the set of system characteristics;
instructions to allocate the plurality of respective hyperconverged loads among a set of hyperconverged nodes that satisfies the set of system characteristics, wherein the allocation prevents any node of the set of hyperconverged nodes from becoming loaded beyond a threshold loading for longer than a predefined period of time;
instructions to repeat the instructions to allocate for a plurality of different sets of hyperconverged nodes, wherein each set of the plurality of different sets represents a different hardware configuration for the hyperconverged system; and
instructions to generate a recommendation that identifies a set of the plurality of different sets that is optimal with respect to a user-defined criterion and that identifies a prediction as to how the arbitrary workload will run on the set of the plurality of different sets, wherein the set of the plurality of different sets further identifies a number of hyperconverged nodes in the set of hyperconverged nodes.

10. The non-transitory machine-readable storage medium of claim 9, wherein each of the hyperconverged load of the plurality of respective hyperconverged loads represents, for a corresponding component of the plurality of components, a fraction of a hyperconverged node of the set of hyperconverged nodes that is consumed by the corresponding component.

11. The non-transitory machine-readable storage medium of claim 10, wherein the corresponding component describes a central processing unit usage of the arbitrary workload for every unit of time over a window of time of system usage.

12. The non-transitory machine-readable storage medium of claim 10, wherein the corresponding component describes a memory usage of the arbitrary workload for every unit of time over a window of time of system usage.

13. The non-transitory machine-readable storage medium of claim 10, wherein the corresponding component describes a network usage of the arbitrary workload for every unit of time over a window of time of system usage.

14. The non-transitory machine-readable storage medium of claim 10, wherein the corresponding component describes a hypervisor overhead of the arbitrary workload for every unit of time over a window of time of system usage.

15. The non-transitory machine-readable storage medium of claim 10, wherein the corresponding component describes storage reads and writes of the arbitrary workload for every unit of time over a window of time of system usage.

16. An apparatus, comprising:
a receiving interface to collect a set of system characteristics for a hyperconverged system;
an input device in communication with a remote computing system, to collect a set of statistics for an arbitrary workload running on the remote computing system; and
a processor in communication with the receiving interface and the input device, to:

separately model a plurality of components of the arbitrary workload by converting the plurality of components into a plurality of respective hyperconverged loads, allocate the plurality of respective hyperconverged loads among a set of hyperconverged nodes that satisfy the set of system characteristics, wherein the allocation prevents any node of the set of hyperconverged nodes from becoming loaded beyond a threshold loading for longer than a predefined period of time, repeat allocating the plurality of respective hyperconverged nodes for a plurality of different sets of hyperconverged nodes, wherein each set of the plurality of different sets represents a different hardware configuration for the hyperconverged system, and generate a recommendation that identifies a set of the plurality of different sets that is optimal with respect to a user-defined criterion and that identifies a prediction as to how the arbitrary workload will run on the set of the plurality of different sets, wherein the set of the plurality of different sets further identifies a number of hyperconverged nodes in the set of hyperconverged nodes.

17. The apparatus of claim 16, wherein the receiving interface comprises a graphical user interface through which a user can provide the set of system characteristics.

* * * * *